(12) United States Patent
Eller et al.

(10) Patent No.: US 7,038,637 B1
(45) Date of Patent: May 2, 2006

(54) SYSTEM AND METHOD FOR SELLING ADVERTISING SPACE ON ELECTRONIC BILLBOARDS OVER THE INTERNET

(75) Inventors: Marc Eller, Dallas, TX (US); Zvi Yaniv, Austin, TX (US)

(73) Assignee: SI Diamond Technology, Inc., Austin, TX (US)

( * ) Notice: Subject to any disclaimer, the term of this patent is extended or adjusted under 35 U.S.C. 154(b) by 529 days.

(21) Appl. No.: 09/553,012

(22) Filed: Apr. 20, 2000

Related U.S. Application Data (60) Provisional application No. 60/130,602, filed on Apr. 22, 1999, provisional application No. 60/147,673, filed on Aug. 6, 1999.

(51) Int. Cl.
*G09G 5/00* (2006.01)

(52) U.S. Cl. .......................................... 345/2.1; 705/14

(58) Field of Classification Search ................. 345/2.1, 345/2.2, 2.3, 1.1, 1.2; 705/14
See application file for complete search history.

(56) References Cited

U.S. PATENT DOCUMENTS

| | | | |
|---|---|---|---|
| 3,614,727 A | 10/1971 | Fritts | |
| D317,790 S | 6/1991 | Hey | D20/39 |
| 5,133,081 A | 7/1992 | Mayo | 455/18 |
| 5,150,116 A | 9/1992 | West | 340/928 |
| 5,214,793 A | 5/1993 | Conway et al. | 455/49.1 |
| 5,353,399 A | 10/1994 | Kuwamoto et al. | |
| 5,504,675 A * | 4/1996 | Cragun et al. | 364/401 |
| 5,510,828 A | 4/1996 | Lutterbach et al. | 348/13 |
| 5,543,856 A | 8/1996 | Rosser et al. | 348/578 |
| 5,737,533 A | 4/1998 | de Hond | 395/200.49 |
| 5,761,601 A | 6/1998 | Nemirofsky et al. | 455/3.1 |
| 5,848,129 A * | 12/1998 | Baker | 348/383 |
| 5,923,252 A | 7/1999 | Sizer et al. | 340/573.1 |
| 5,933,811 A * | 8/1999 | Angles | 705/14 |
| 5,937,392 A * | 8/1999 | Alberts | 705/14 |
| 5,940,073 A | 8/1999 | Klosterman et al. | 345/327 |
| 5,946,646 A | 8/1999 | Schena et al. | 702/177 |
| 5,956,024 A | 9/1999 | Strickland et al. | 345/327 |
| 5,974,398 A * | 10/1999 | Hanson et al. | 705/14 |
| 5,980,090 A * | 11/1999 | Royal et al. | 700/216 |
| 6,002,450 A | 12/1999 | Darbee et al. | 348/734 |
| 6,009,409 A | 12/1999 | Adler et al. | 705/14 |
| 6,015,344 A * | 1/2000 | Kelly et al. | 463/16 |
| 6,052,629 A * | 4/2000 | Leatherman et al. | 700/216 |

(Continued)

FOREIGN PATENT DOCUMENTS

AU                48849 90 A         8/1990

(Continued)

*Primary Examiner*—Xiao Wu
*Assistant Examiner*—Kevin M. Nguyen
(74) *Attorney, Agent, or Firm*—Kelly K. Kordzik; Winstead Sechrest & Minick P.C.

(57) ABSTRACT

Electronic billboards, which may be indoor or outdoor are located in various geographical areas. Associated with each billboard is a web address. A client desiring to display information, such as an advertisement, on any selected electronic billboard can upload the information over the Internet to the server implementing the billboard website. The client can select the time and duration for the information to be displayed, and can even purchase the display time using a credit card or through the use of some other type of account.

13 Claims, 6 Drawing Sheets

U.S. PATENT DOCUMENTS

| | | | |
|---|---|---|---|
| 6,085,177 A * | 7/2000 | Semple et al. | 235/379 |
| 6,167,382 A * | 12/2000 | Sparks et al. | 705/14 |
| 6,186,893 B1 | 2/2001 | Walker et al. | 463/20 |
| 6,215,411 B1 * | 4/2001 | Gothard | 340/815.4 |
| 6,219,696 B1 * | 4/2001 | Wynblatt et al. | 705/14 |
| 6,252,522 B1 * | 6/2001 | Hampton et al. | 340/905 |
| 6,360,137 B1 * | 3/2002 | Royal et al. | 700/231 |
| 6,408,278 B1 * | 6/2002 | Carney et al. | 705/14 |

FOREIGN PATENT DOCUMENTS

| | | |
|---|---|---|
| CH | 686 750 A5 | 6/1996 |
| EP | 0 131 211 A | 1/1985 |
| WO | WO 97/23831 A | 7/1997 |
| WO | WO 97/41546 A | 11/1997 |

* cited by examiner

SYSTEM AND METHOD FOR SELLING ADVERTISING SPACE ON ELECTRONIC BILLBOARDS OVER THE INTERNET

CROSS REFERENCE TO RELATED APPLICATIONS

The present application claims priority to both of the following U.S. provisional patent applications:

Ser. No. 60/130,602, filed Apr. 22, 1999, entitled "System and Method for Selling Advertising Space on Electronic Billboards over the Internet"; and Ser. No. 60/147,673, filed Aug. 6, 1999, entitled "System and Method for Selling Advertising Space on Electronic Billboards over the Internet."

TECHNICAL FIELD

The present invention relates in general to computer networks, and in particular, to performing e-commerce transactions over the Internet.

BACKGROUND INFORMATION

Electronic billboards are poised to transform the billboard industry by permitting multiple ads to be displayed on an electronic billboard at any desired time and frequency. Moreover, the transportation of the ads to a particular billboard can be made using any type of electronic means, including wireless transmission.

SUMMARY OF THE INVENTION

The present invention permits a user to access the billboard provider's website to order and upload a desired ad to a particular billboard anywhere within the world.

More specifically, an advertiser can upload advertising data to a server operating a particular billboard via a remote computer. Once approved for content, the advertising data can then be transmitted to the billboard for display at a time and duration selected by the advertiser.

The billboard to display the advertising information can be located indoors or outdoors.

Though the present invention is described with respect to the display of advertisements, any information, including video and still images can be uploaded and displayed on the indoor or outdoor billboards in accordance with the present invention.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Outdoor billboards are located throughout the United States and even worldwide. Traditionally, billboards have been of the paper/poster type, where the ad on the billboard must be manually changed on a periodic basis using one or more workers. As a result, for a definitive period of time, usually one month or longer, only a single ad can be displayed on any particular billboard.

Indoor billboards are also gaining a foothold by displaying on the inside walls, or other locations, information about products and special sales within the store. Again, the problem with such traditional posters and indoor billboards is that they must be manually changed, thus limiting their versatility and effectiveness.

Figure 1:
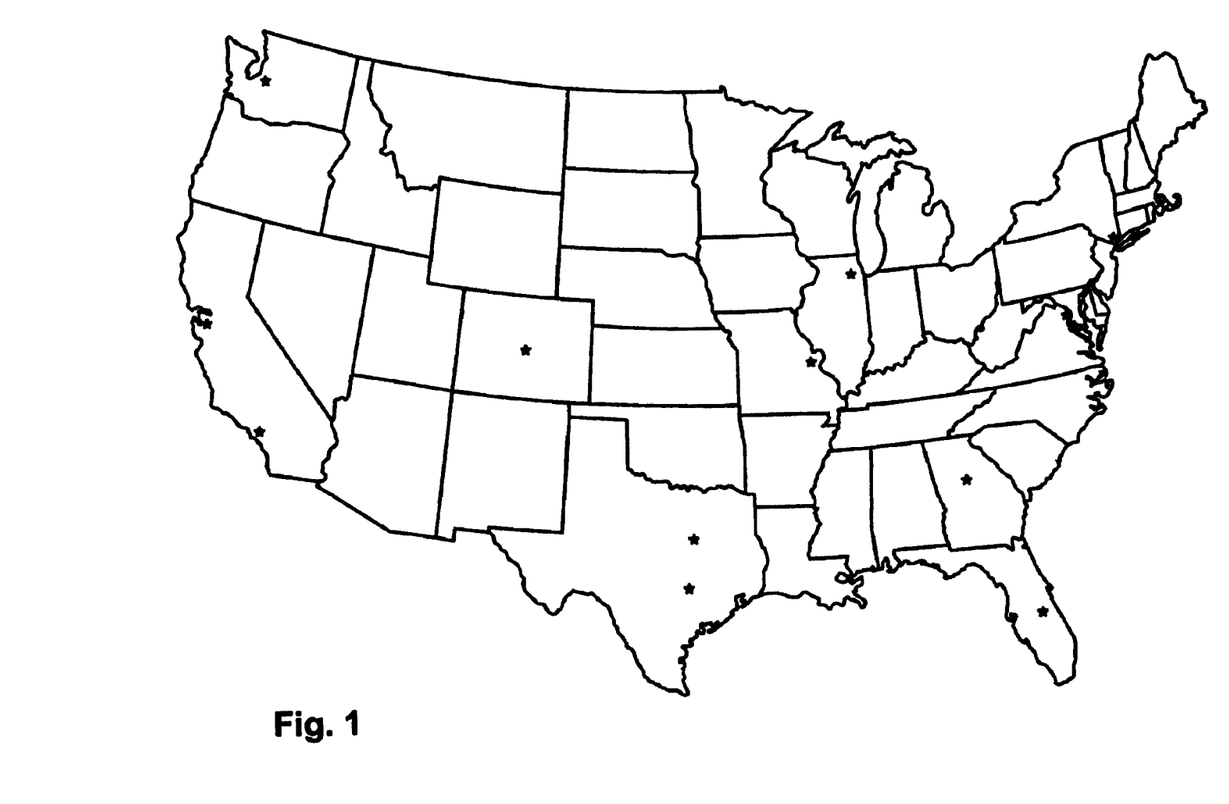
FIG. 1 illustrates an example of billboard locations within the continental United States.
Figure 2A:
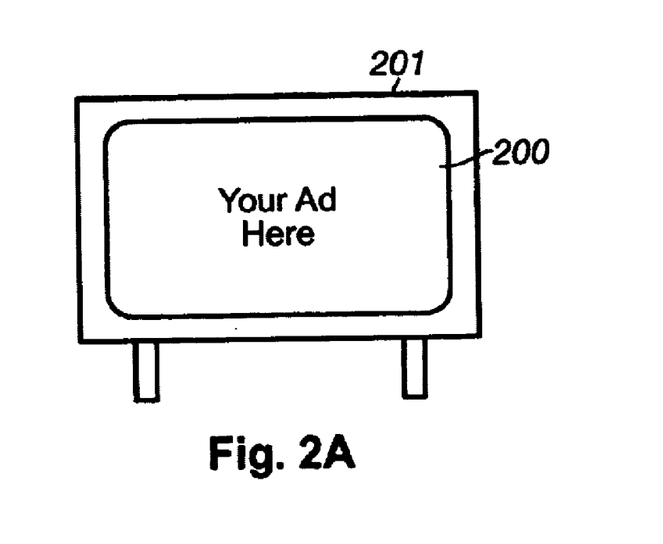
FIG. 2 illustrates an electronic billboard.
Figure 2B:
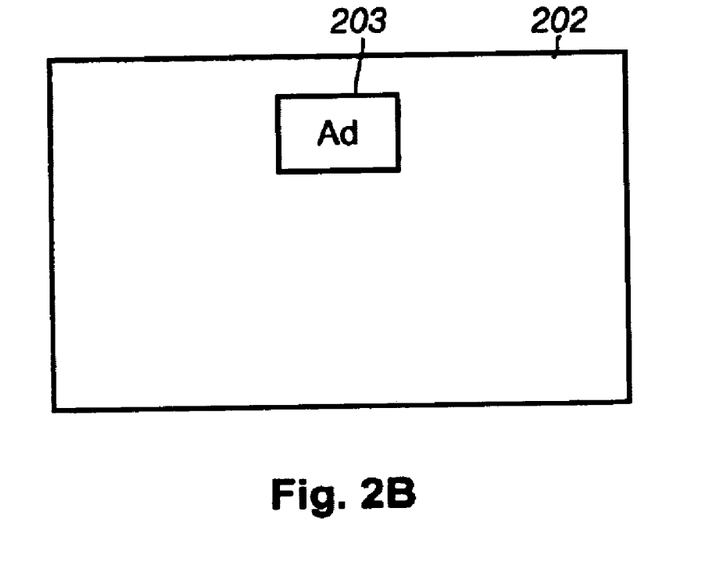

Electronic billboards, such as the ones illustrated in FIGS. 2A and 2B, have the capability of displaying still or video images in a manner similar to a television or a computer display. FIG. 2A illustrates an outdoor billboard 201 having an electronic display 200 configured in accordance with one embodiment of the present invention. FIG. 2B illustrates an indoor electronic billboard 203 for displaying advertising information, or any other information, on a wall 202 of the inside of the store. A processor and memory device, along with driver electronics and software are located at the electronic billboard site. The images to be displayed can be stored within the memory, and then are displayed in a desired manner using software. For example, a multitude of different ads can be displayed at different and preselected frequencies and durations of time. The ads can be uploaded to the billboard system through a direct connection locally, or remotely using landlines, cable, satellite signaling, fiber optic cable, wireless transmissions, etc. As a result, a central location can upload various ads to various billboards located across the United States (FIG. 1 illustrates an example of electronic billboards, noted by X's, throughout the United States), or even worldwide. Alternatively, any one or more of the billboards noted by the exemplary locations on FIG. 1 could be indoor billboards as described above.

The further advantage of the present invention is that it permits a client who wishes to purchase ad space on a particular electronic billboard to do so completely, or almost completely, without the intervention by the billboard provider.

Alternatively, a company utilizing indoor, or outdoor, billboards at store locations in various geographic areas, could upload any desired information to any selected billboard remotely. For example, if a particular company decided to run a Labor Day sale, it could merely upload an ad describing such sale to selected billboards at selected stores throughout the world.

Figure 3:
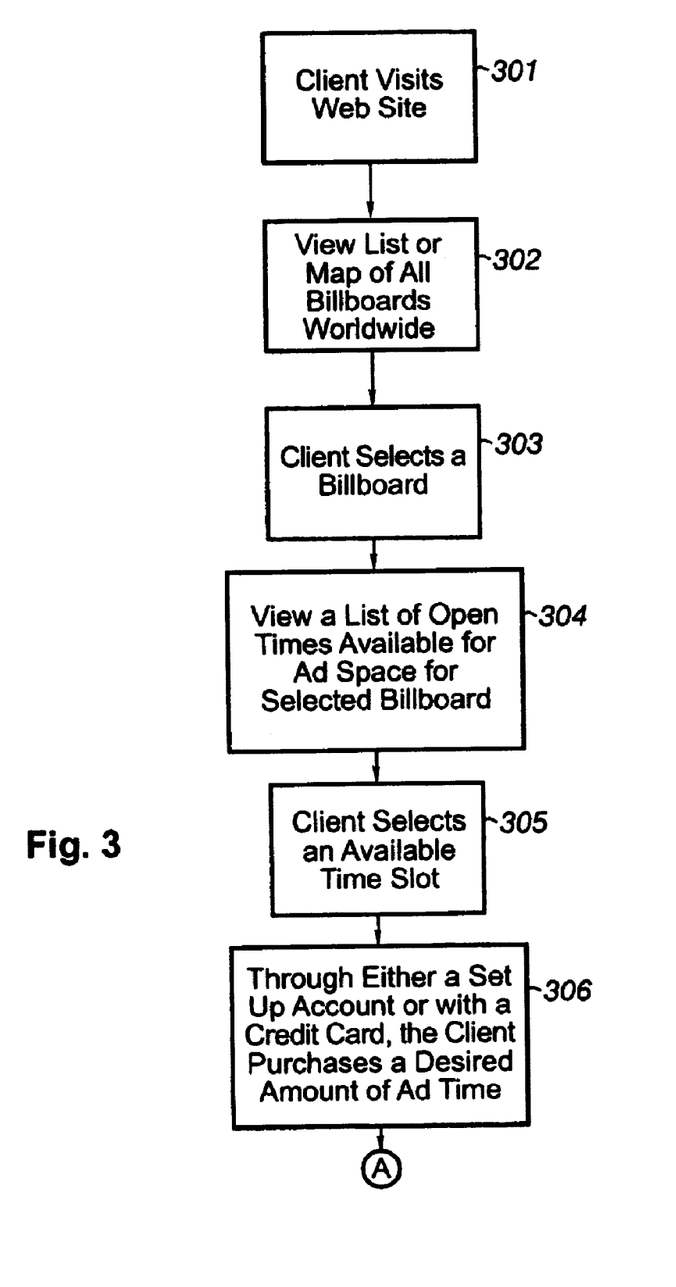
FIG. 3 illustrates a flowchart configured in accordance with the present invention.

Referring to FIG. 3, a client who wishes to display their ad on a particular billboard somewhere within the world will log on to a network, such as the Internet or the Internet 2, and visit the website operated by the billboard provider. In step 302, the client may view a map of the United States, any other country, or even the entire world with indications where the billboard provider's electronic billboards are located. Using a zoom feature, the client may zoom in on a particular location, such as New York City, to pinpoint the location of the electronic billboard, down to the precise city block. Furthermore, the client may view a photo of the billboard showing the billboard height, width, the direction the billboard is facing, etc. Alternatively, even an image of an indoor billboard can be displayed to the client.

In step 303, the client will select a billboard. In step 304, a list of open times and their durations available for ad space at the selected billboard is provided to the client. The client, in step 305, can then select an available time slot and duration. Upon selection of the available time slot and duration, the cost for the ad space may be provided to the client in those instances where a fee is applicable. Such ad fee may be dependent on several factors, including the time of day during which the ad will be displayed.

In step 306, the client will purchase the desired amount of time (if applicable). Such a purchase could be made with a credit card, or the clients may already have an account set up with the billboard provider. Alternatively, a password could be required to be entered before being able to upload any software to the billboard.

In step 307, the client proceeds to prepare their own ad (or other information to be displayed) for display. As an alternative, the client may already have an ad, which the client may upload to the billboard provider. If the client needs to prepare an ad, it may do so using prepackaged software, such as PowerPoint™, or a software package may be downloaded from the billboard provider, which enables the client to create an ad. Once the ad is created, then the client may upload the created ad to a central location for approval by the billboard provider in step 308. It is contemplated that such an approval will be required so that the billboard provider can ensure that the displayed ad conforms to the local laws where the billboard is located. Nevertheless, certain pre-approved clients may be able to skip step 308 and upload their ad directly to the billboard system.

In step 309, once approved, the ad is scheduled by the billboard provider for download to the selected billboard system for display at the desired time and duration. Furthermore, a software key may be used by the billboard provider to ensure that only their own secure transmissions are sent to the billboards.

Figure 4:
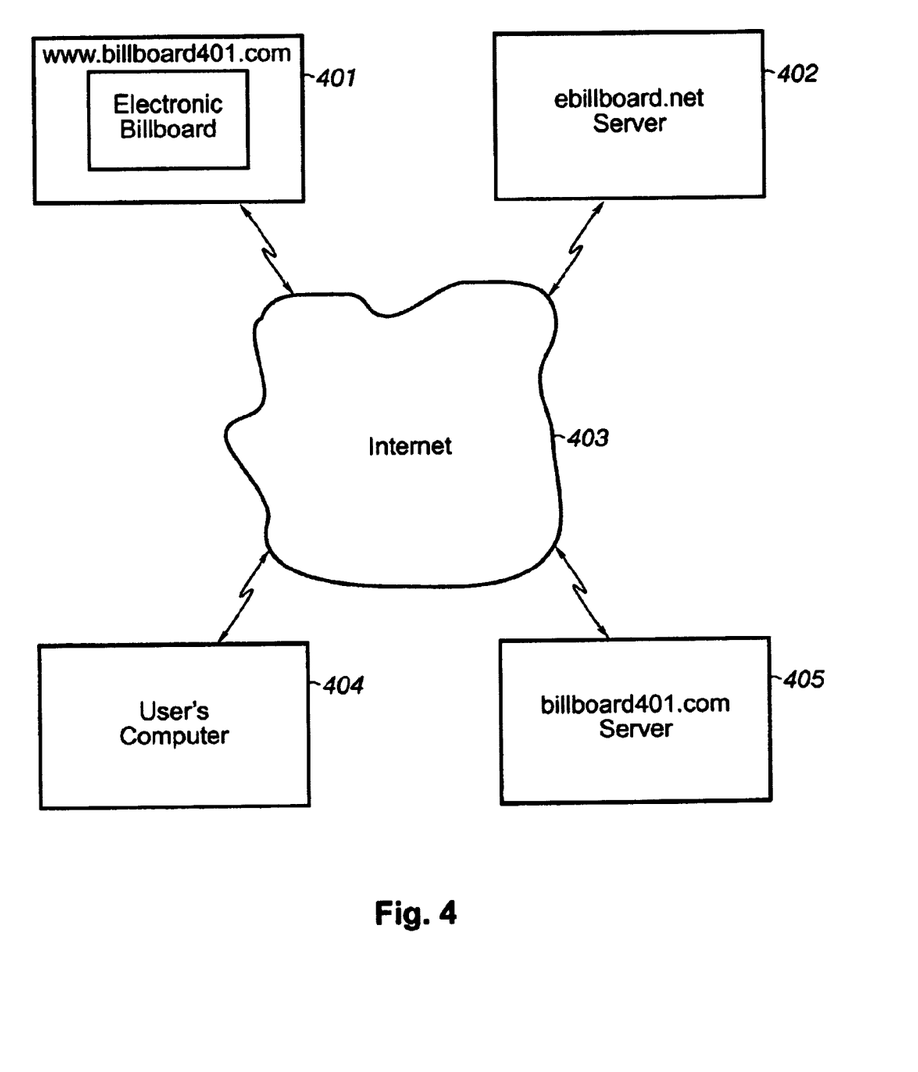
FIG. 4 illustrates a process for enabling a viewer of a billboard to receive other information about products advertised on that particular billboard.

Referring to FIG. 4, electronic billboards, such as electronic billboard 401 can be located anywhere within the world. In addition, each billboard may have its own website associated with it, wherein the website will be supported by server 405. Server 405 will maintain the web page for billboard 401, and will be accessible by a user over the Internet 403 by going to www.billboard401.com. In the process described above with respect to FIG. 3, an option may be given to the advertiser to provide further information regarding the ad to be displayed on billboard 401. Such additional information may include details about the product advertised, links to other web sites, etc. If the advertiser uploads such information, the ebillboard.net server 402 will then subsequently download that information to billboard 401.com. Subsequently, when an individual views that particular advertisement on billboard 401, somewhere on billboard 401 there will be a message that further information regarding products shown on the billboard 401 can be found at billboard401.com. This message could be displayed by the electronic billboard, or could merely be printed on the border of billboard 401. Then, when the person gets to their computer 404, and they access billboard 401.com, they will be able to view the additional information provided by the advertiser. The foregoing will be performed for each individual billboard throughout the entire world, wherein each such billboard will have its own web page.

Each billboard could also broadcast, on particular wireless frequencies to passers by, information about the billboard or its ads, in a manner similar to the way airport information is broadcast to car radios when cars near an airport.

Figure 5:
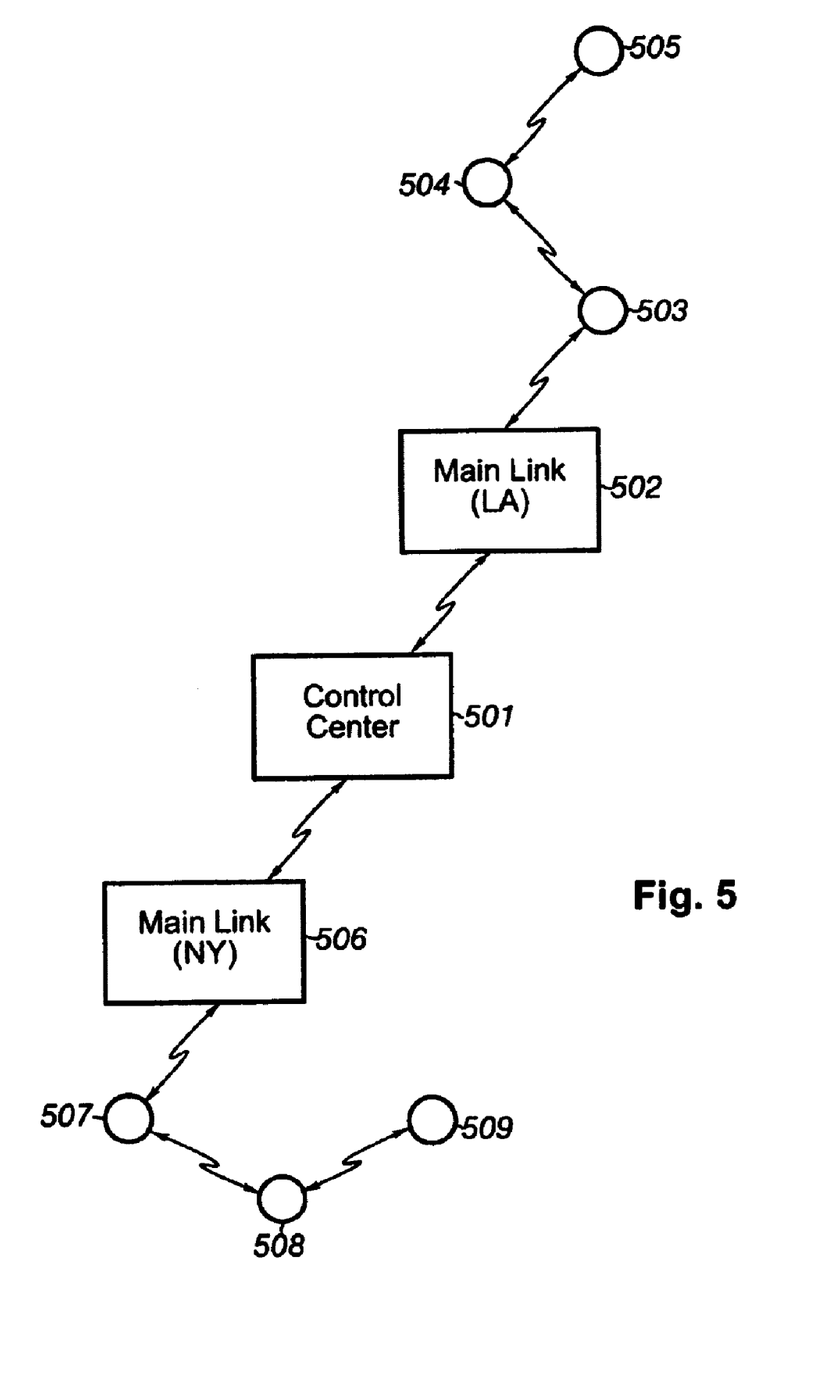
FIG. 5 illustrates an architecture for transmitting data to and from various billboards.

Referring to FIG. 5, one of the issues regarding implementation of electronic billboards is the transmission of the data to and from the billboards in a wireless mode. Although cellular, satellite, fiber and cable technologies can perform this function, another viable transmission medium is radio frequency (RF) waves. By using voice mobile channels, for example, which cover distances up to 15 miles, the system would be able to digitally repeat data messages for other data links and at the same time provide data input/output services at a node (billboard). A path could include up to several repeaters. As a result, the system could easily cover 120–150 miles from a source location, which is connected by telephone, cellular modem, satellite, etc. to a central control center. Such a central control center 501 may house the ebillboard.net server 402. The link to the main link 502 in one city (e.g., Los Angeles) could be made by any type of telecommunications means, as described above. Likewise, the connection between control center 501 and the main link 506 (e.g., New York) could also be made by any type of telecommunications link. Each main link will then have a wireless connection to a first repeater node 503, 507, which are then connected by a wireless connection to the next repeater node 504, 508, which could then be coupled to the next repeater node 505, 509 by another wireless connection. Each of these nodes involves a wireless repeater, and may be located at the various billboard sites within the particular locale. As a result, a main link can communicate with all the billboards within an area by wireless RF communications.

Although the present invention and its advantages have been described in detail, it should be understood that various changes, substitutions and alterations can be made herein without departing from the spirit and scope of the invention as defined by the appended claims.

What is claimed:

1. A method for displaying information on an electronic billboard, comprising the steps of:
   providing a first electronic billboard at a first location;
   coupling a first information handling system to the first electronic billboard so that the first information handling system can control information to be displayed on the first electronic billboard;
   providing a second electronic billboard at a second location;
   coupling a second information handling system to the second electronic billboard so that the second information handling system can control information to be displayed on the second electronic billboard;

coupling the first and second information handling systems to a third information handling system over the Internet;

selecting, via the third information handling system, which of the first and second electronic billboards will display the information;

uploading the information from the third information handling system over the Internet to the information handling system controlling the selected electronic billboard; and displaying the information on the selected electronic billboard, wherein the selected electronic billboard is selected from a list of available electronic billboards which includes the first and second electronic billboards, wherein the list includes a map of the first and second locations.

2. A method as recited in claim 1, wherein the map is displayed on the third information handling system.

3. A system for displaying information on an electronic billboard, comprising:

means for providing a first electronic billboard at a first location;

means for coupling a first information handling system to the first electronic billboard so that the first information handling system can control information to be displayed on the first electronic billboard;

means for providing a second electronic billboard at a second location;

means for coupling a second information handling system to the second electronic billboard so that the second information handling system can control information to be displayed on the second electronic billboard;

means for coupling the first and second information handling systems to a third information handling system over the Internet;

means for selecting, via the third information handling system, which of the first and second electronic billboards will display the information;

means for uploading the information from the third information handling system over the Internet to the information handling system controlling the selected electronic billboard; and means for displaying the information on the selected electronic billboard, wherein the selected electronic billboard is selected from a list of available electronic billboards which includes the first and second electronic billboards, wherein the list includes a map of the first and second locations.

4. A system for displaying information on an electronic billboard, comprising:

means for providing a first electronic billboard at a first location;

means for coupling a first information handling system to the first electronic billboard so that the first information handling system can control information to be displayed on the first electronic billboard;

means for providing a second electronic billboard at a second location;

means for coupling a second information handling system to the second electronic billboard so that the second information handling system can control information to be displayed on the second electronic billboard;

means for coupling the first and second information handling systems to a third information handling system over the Internet;

means for selecting, via the third information handling system, which of the first and second electronic billboards will display the information;

means for uploading the information from the third information handling system over the Internet to the information handling system controlling the selected electronic billboard;

means for displaying the information on the selected electronic billboard; and means for charging an amount of money for the display of the information on the selected electronic billboard, wherein the selected electronic billboard is selected from a list of available electronic billboards which includes the first and second electronic billboards, wherein the list includes a map of the first and second locations.

5. A method of advertising, comprising the steps of:

uploading advertising data to an ebillboard.net server via a remote computer by an advertiser;

uploading additional information concerning the advertiser via the remote computer by the advertiser at the advertiser's option;

transmitting the advertising data from the ebillboard.net server to a selected billboard;

transmitting the optional additional information concerning the advertiser from the ebillboard.net server to a web site dedicated to the selected billboard;

displaying on the selected billboard the advertising information at a selected time.

6. The method as recited in claim 5, wherein a consumer viewing the selected billboard is informed of the availability of additional information concerning the advertiser at the web site dedicated to the selected billboard.

7. A computer program product adaptable for storage on a computer readable medium, the computer program product operable for displaying information on an electronic display, comprising the program steps of:

receiving over a first network first information and a designation of a first target display; and sending the first information over a second network to the first designated target display, wherein the first information is accompanied with a time when the first information is to be displayed on the first designated target display, and wherein the second network is the Internet.

8. A computer program product adaptable for storage on a computer readable medium, the computer program product operable for displaying information on an electronic display, comprising the program steps of:

receiving over a first network first information and a designation of a first target display; and sending the first information over a second network to the first designated target display, wherein the first information is accompanied with a time when the first information is to be displayed on the first designated target display, and wherein the first and second networks are part of the Internet.

9. A computer program product adaptable for storage on a computer readable medium, the computer program product operable for displaying information on an electronic display, comprising the program steps of:

receiving over a first network first information and a designation of a first target display; and sending the first information over a second network to the first designated target display, wherein the first information is accompanied with a time when the first information is to be displayed on the first designated target display, wherein the first designated target display is selected from one of a plurality of target displays to which the first information could be designated, and wherein the first and second networks are part of the Internet.

10. The computer program product as recited in claim 9, further comprising the program steps of:

receiving over the first network second information and a designation of a second target display; and sending the second information over the second network to the second designated target display.

11. The computer program product as recited in claim 9, wherein in the receiving step the first information is accompanied with a designation of a second target display, and further comprising the program step of sending the first information over the second network to the second designated target display.

12. A computer program product adaptable for storage on a computer readable medium, the computer program product operable for uploading content to an electronic display, comprising the program steps of:

receiving content;

receiving a designation of a target display device to display the content; and receiving a designation of a time that the target display device is to display the content, wherein the second receiving program step further comprises the program steps of:

outputting information on whether the target display device is available to display the content;

permitting a selection of the target display device if it is available to display the content; and preventing a selection of the target display device if it is not available to display the content.

13. A computer program product adaptable for storage on a computer readable medium, the computer program product operable for uploading content to an electronic display, comprising the program steps of:

receiving content;

receiving a designation of a target display device to display the content; and receiving a designation of a time that the target display device is to display the content, wherein the third receiving program step further comprises the steps of:

outputting information on date and time availability of the target display device to display the content;

permitting a selection of the target display device at a selected date and time if the target display device is available to display the content at the selected date and time; and preventing a selection of the target display device at the selected date and time if the target display device is not available to display the content at the selected date and time.

* * * * *